Aug. 30, 1966 D. J. TESTON 3,269,411
LECTURE BOTTLE REGULATOR
Filed Feb. 12, 1964

INVENTOR.
DAVID J. TESTON
BY Richard S. Shreve, Jr.
ATTORNEY

United States Patent Office 3,269,411
Patented August 30, 1966

3,269,411
LECTURE BOTTLE REGULATOR
David J. Teston, Cranford, N.J., assignor to Union Carbide Corporation, a corporation of New York
Filed Feb. 12, 1964, Ser. No. 344,412
3 Claims. (Cl. 137—613)

This invention relates to lecture bottle regulators, and more particularly to a miniature regulator valve for controlling the flow rate of compressed gases, particularly corrosive types, and such as carrier, trace, reactant or catalytic gases in experimental reaction or test systems.

It has been proposed to discharge lecture bottles through conventional throttle valves, but these are difficult for fine adjustment particularly for small flows. Furthermore, frequent readjustment is necessary as the contents of the lecture bottle are withdrawn, resulting in consecutive pressure drops. Adjustments of such oversize throttle valves have caused large differentials.

It is, therefore, the main object of the present invention to provide a lecture bottle regulator capable of fine adjustment, preferably for flows as high as ten cubic feet per hour or as low as a few cubic centimeters per minute.

Other objects are to provide a regulator in which parts contacted by the fluid are constructed of corrosion resistant material and to provide a regulator inlet for direct connection to the lecture bottle.

According to the present invention, the regulator has an outlet passageway having a capillary bore, and a needle valve closing said bore and having a conical end with an included angle of the order of 30 degrees. Preferably, the parts contacted by the fluid are largely of corrosion resistant plastic except the parts requiring high strength and precision machining which are of corrosion resistant metal such as stainless steel. Preferably the inlet of the regulator has external threads to secure the internal threads of the lecture bottle mouth, and an annular shoulder to seal the lip of the bottle mouth.

Figure 1:
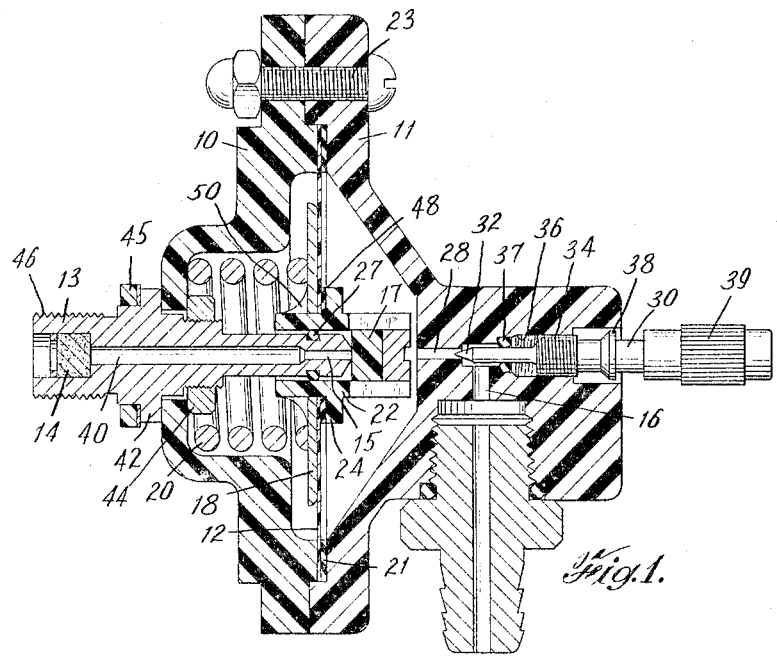
FIGURE 1 is a section taken along the line 1—1 of FIGURE 2.
Figure 2:
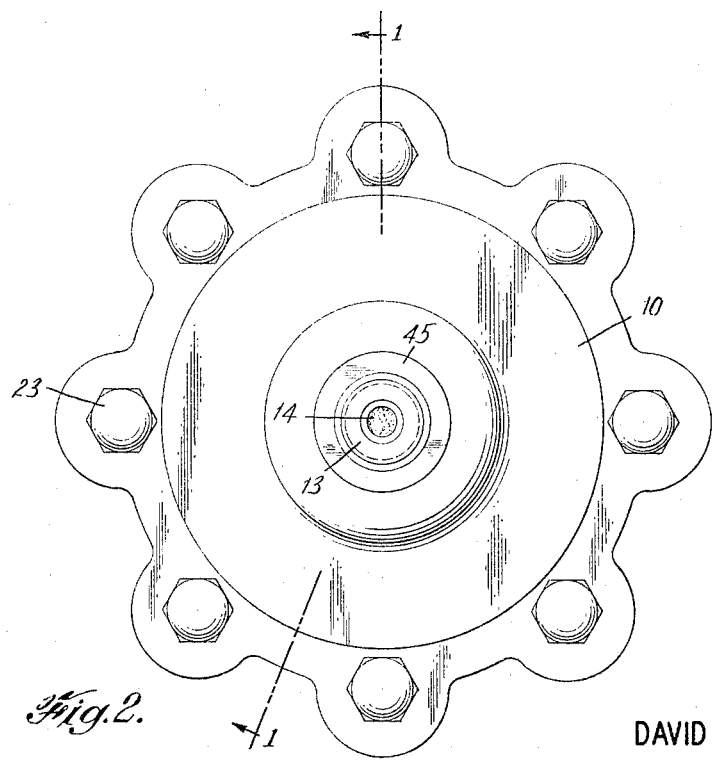
FIGURE 2 is a plan of the inlet end of the regulator according to the preferred embodiment of the present invention.

The regulator casing is composed of two parts 10 and 11, between which is clamped a diaphragm 12. An inlet fitting 13 has a passage through a filter 14 to a precision passage 15 for cooperation with a movable valve seat 17. After the gas has passed through the passage 15, it moves through the outlet passage 16 to its place of use. A spring 20 engages the diaphragm plate 12 to oppose the outlet pressure acting on the opposite side of the diaphragm. An outer gasket 21 is insertable adjacent to the periphery of the diaphragm when it is subject to the clamping pressure, for example by bolts 23.

The movable valve seat member is carried by and secured to the diaphragm with the end of a tubular guide 22 having a flange 24 which engages the diaphragm on one side. A silicone rubber O ring 27 is carried by the member 13 and engages the inner wall of the tubular guide holder 22.

According to the present invention, the spring 20 is not adjustable, but instead is preset for a delivery pressure of 3 to 5 p.s.i. gauge, and means are provided for precision adjustment of the flow of gas through the outlet 16. In the form shown the body portion 11 is provided with a precision bore 28 reamed to a diameter of the order of one thirty-second of an inch.

The bore 28 is counterbored to receive a needle valve 30, preferably of stainless steel and having a sharp pointed conical end 32 with an included angle of the order of 30 degrees to engage the outlet end of the bore 28. The stem of the needle valve is externally threaded to form a screw 34, mating with internal threads in the counterbore 36.

The counterbore diameter has a stepped intermediate diameter to receive an O ring 37 of silicone rubber, which engages the needle valve 30 between the screw 34 and the conical end 32, and is free floating to take up backlash in the threads 34.

Beyond the threads 34 the needle valve 30 is undercut in the root diameter to pass the internal threads and enter the counterbore, followed by a chamfered stop 38. The outer end of the needle valve 30 is straight knurled to form a thumb piece 39.

The inlet nozzle 13 has an annular flange 42 resting on top of the cover 11 and secured thereto in stationary position by a nut 44 inside the cover. The outer end of the nozzle 40 has external threads 46 to receive the internal threads of the lecture bottle mouth piece direct connection threads. The top of the flange 42 receives a resilient washer 45 engaged by the top of the bottle mouth to effect a seal thereof. The nozzle 13 is preferably of one-piece stainless steel or other corrosion resistant metal having a capillary bore 40 therethrough to form the inlet passage.

The tubular guide 22 passes through a central aperture in the diaphragm 12. An inner gasket 48 is interposed between the guide flange 24 and the diaphragm. The guide 22 has an annular groove to receive the inner parts of a fillet snap ring 50, the outer parts of which extend outward and toward the diaphragm plate 18.

The diaphragm 12 and valve seat 17 are preferably of non-metallic, corrosion resistant, organic plastic, preferably polytetrafluorethylene. The O rings and inner and outer diaphragm gaskets are preferably of silicone rubber.

The casing parts 10 and 11 and tubular guide 22 are of non-metallic, corrosion resistant, organic plastic, preferably polyvinylchloride.

It should be noted that the delivery pressure tends to close the valve. This is of advantage in case foreign particles or leakage end to interfere with the operation.

What is claimed is:

1. A pressure responsive valve comprising in combination a casing, a diaphragm in said casing, a stationary inlet nozzle having a capillary bore therethrough and mounted in said casing, an outlet passageway, a tubular guide carried by said diaphragm and receiving said nozzle, an inlet valve seat in said tubular guide engaging said bore, an outlet needle valve in said outlet passageway, said stationary inlet nozzle and said outlet needle valve each comprising a single piece of stainless steel, and said casing and said diaphragm, said tubular guide and inlet valve seat are of non-metallic, corrosion resistant, organic plastic, whereby said pressure responsive valve may operate with corrosion fluids.

2. A pressure responsive valve as claimed in claim 1 in which said casing and tubular guide are of polyvinylchloride, and said diaphragm and inlet valve seat are of polytetrafluorethylene.

3. A pressure responsive valve as claimed in claim 1, in which said stationary inlet nozzle has external threads adapted to receive internal threads in the mouth of a lecture bottle, and an annular shoulder beyond said threads adapted to seal the lip of the lecture bottle mouth.

(References on following page)

References Cited by the Examiner

UNITED STATES PATENTS

| | | | |
|---|---|---|---|
| 1,858,084 | 5/1932 | Heidbrink | 132—613 |
| 2,753,887 | 7/1956 | Meincke | 137—505.42 |
| 2,768,643 | 10/1956 | Acomb | 137—505.42 |
| 2,854,991 | 10/1958 | Webster | 137—505.42 X |
| 2,998,021 | 8/1961 | Becker | 137—505.25 X |
| 3,004,686 | 10/1961 | McKee | 137—505.25 X |
| 3,057,370 | 10/1962 | Hamilton | 251—368 X |
| 3,139,898 | 7/1964 | Wiltgen | 251—368 X |

FOREIGN PATENTS

| | | |
|---|---|---|
| 692,653 | 6/1953 | Great Britain. |
| 898,979 | 6/1962 | Great Britain. |
| 926,713 | 5/1963 | Great Britain. |

WILLIAM F. O'DEA, *Primary Examiner.*

ISADOR WEIL, *Examiner.*

H. WEAKLEY, *Assistant Examiner.*